Patented Aug. 14, 1923.

1,464,511

UNITED STATES PATENT OFFICE.

ALEXANDER W. STOTT, OF BROOKLYN, NEW YORK, ASSIGNOR TO THE HILLS BROTHERS COMPANY, INC., A CORPORATION OF NEW YORK.

METHOD OF AND APPARATUS FOR SEPARATING DATES.

Application filed January 3, 1922. Serial No. 526,469.

*To all whom it may concern:*

Be it known that I, ALEXANDER W. STOTT, a citizen of the United States, residing at Brooklyn, in the county of Kings and State of New York, have invented certain new and useful Improvements in Methods of and Apparatus for Separating Dates, of which the following is a full, clear, and exact description.

My invention relates to the art of separating the individual fruit in a compacted, adhering mass, and while my invention is of general application it is particularly useful in the date industry and will be described with especial reference to the treatment of dates.

Dates are generally received by the distributor packed in relatively large boxed or crated masses which are more or less solid by reason of the adhesion of the exuded sugars, and to prepare these for marketing it is customary for the distributor to wash, clean, sort and repack them in small cartons. This has heretofore been largely done by hand, necessarily a slow and expensive operation, and has required the picking out and handling of each individual date.

Efforts have been made from time to time to perform this operation mechanically but without success. An object of my invention is to provide a method for this purpose which readily lends itself to mechanical performance and to provide an apparatus which will be simple, reliable and inexpensive.

My invention contemplates developing a force in the mass and utilizing this force to cause the dates to separate themselves from the mass. In the preferred form the force developed is centrifugal force although conceivably the inertia of the individual dates could be made to cause them to separate in other ways. Before developing the centrifugal force in the mass of dates they will usually be subjected to the action of a stream of solvent fluid, such as steam or hot water, or both. The water may be made to flow over the dates during practically the entire operation and in this way they will be thoroughly washed at the same time that they are being separated. My invention also contemplates subjecting the separated dates to a shaking action to dry them and also to remove dirt and other foreign particles therefrom.

Specifically my method also contemplates breaking up the mass into a plurality of smaller masses preliminary to subjecting the dates to the centrifugal action, and this may be done by dropping the entire mass upon the revolving member from a sufficient height to effect the desired result.

As an apparatus for carrying out my method, my invention comprehends a rapidly revolving table, which may be slightly conical in shape, and which has near its periphery at least one circumferential row of pins spaced to break up the adhering dates into small units. If two rows of pins are used they are preferably staggered. A suitable hopper may overhang the center of the table and a steam or hot water nozzle may project through one side of the hopper to deliver a stream upon the mass of dates passing through the hopper. The water will then run down upon the table and keep the table and the dates thereon in more or less of a flooded condition and serve to wash the dates during the separating operation.

In accordance with my invention I also provide a revolving platform surrounding and immediately below the table which receives the dates as they emerge in a separated condition from between the pins. A scraper extends across the platform and removes the dates from the platform into any suitable receptacle, preferably on to a shaker for the purpose above specified.

My invention also comprehends various other features of construction and has other objects and advantages as will hereinafter more fully appear.

I shall now describe my invention with reference to the apparatus illustrated in the accompanying drawings and shall thereafter point out my invention in claims.

Figure 1:
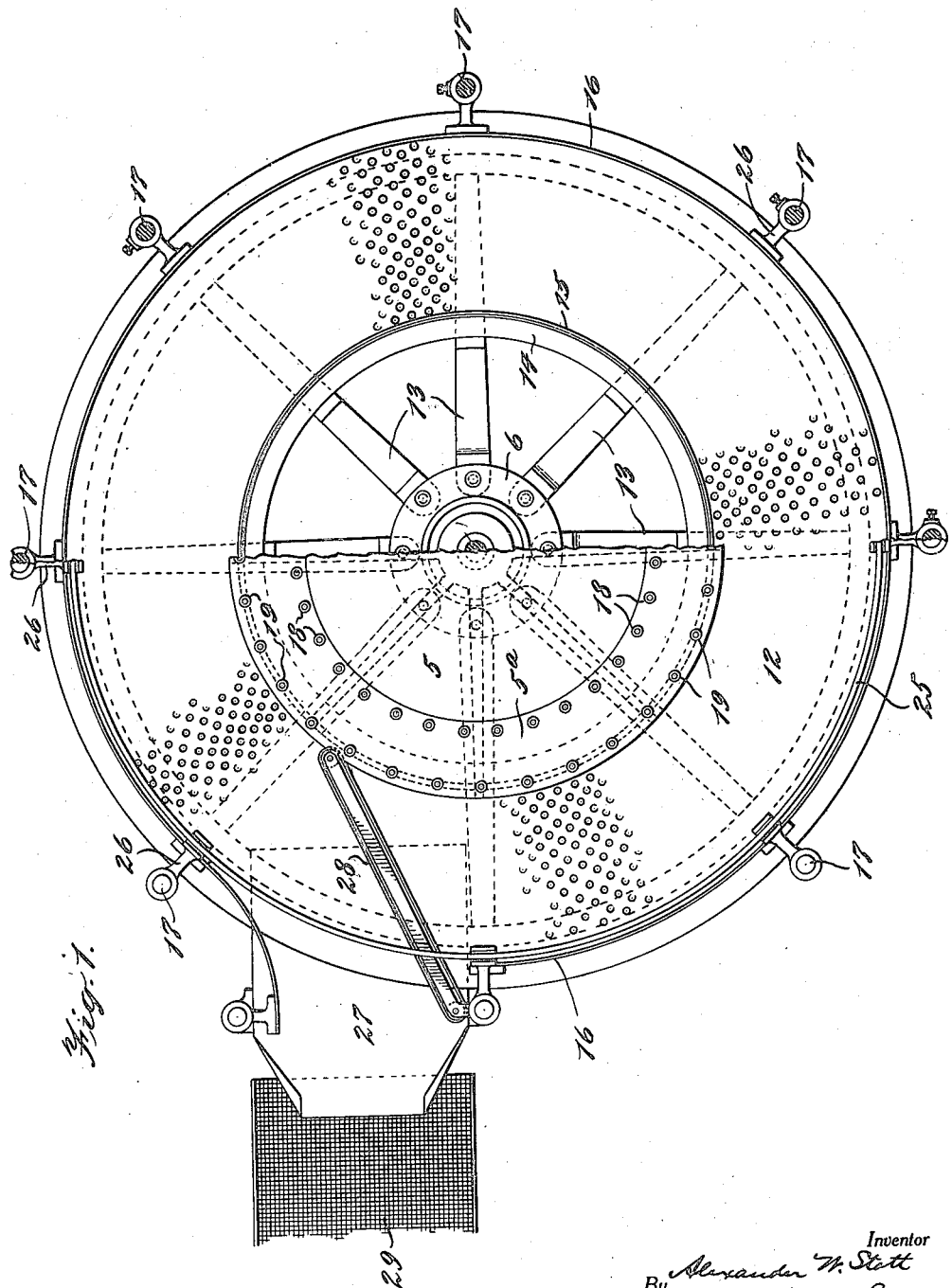
Fig. 1 is a partial plan and a partial horizontal section of a mechanism embodying my invention and adapted to carry out my method.
Figure 2:
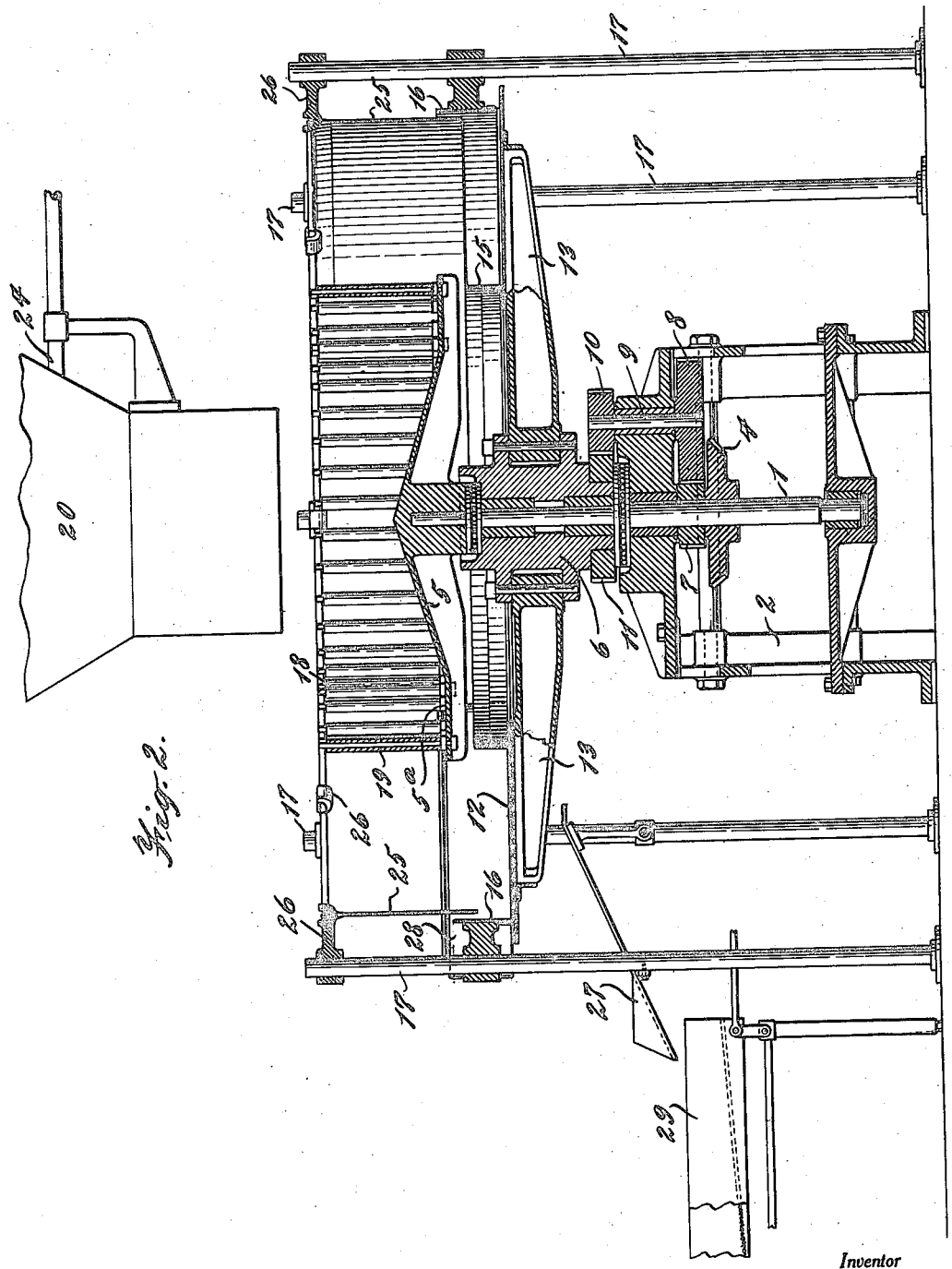
Fig. 2 is a vertical section of the same.
Figure 3:
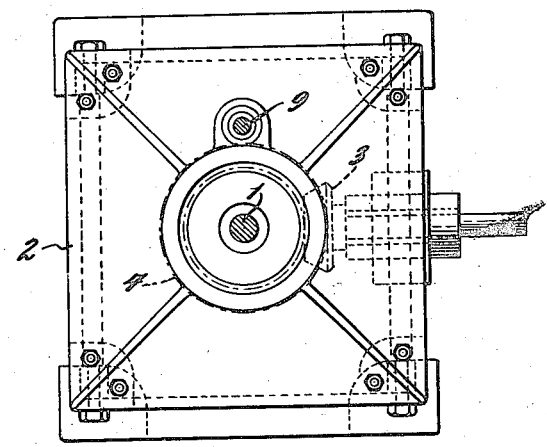
Fig. 3 is a plan of the frame of the machine.
Figure 4:
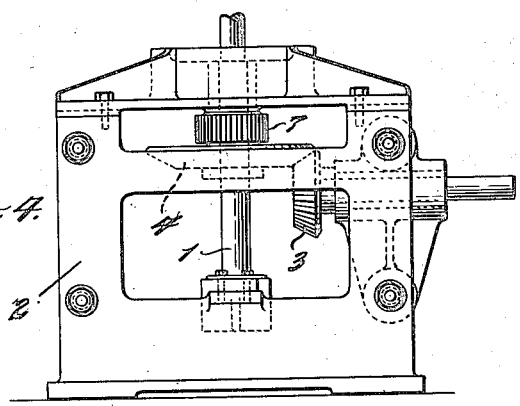
Fig. 4 is an elevation thereof.
Figure 5:
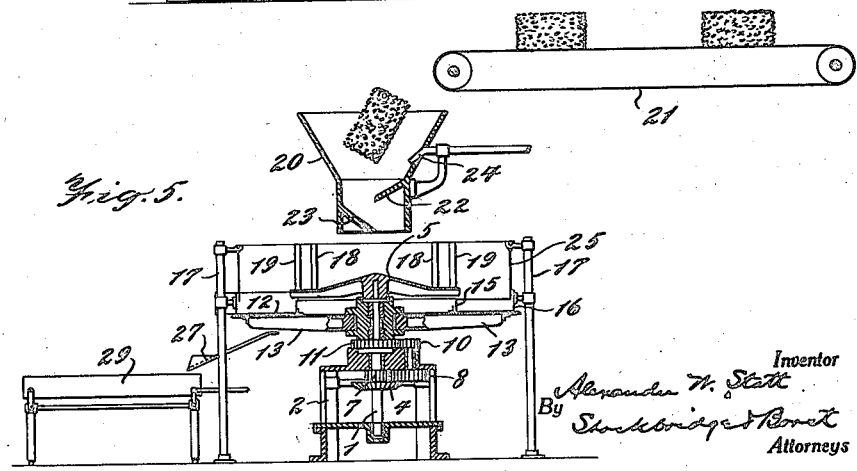
Fig. 5 is a view similar to Fig. 1, showing the parts on a reduced scale and the feed hopper in section.

The vertical drive shaft 1 is provided with suitable bearings at the top and bottom of the frame 2 of the machine, being rotated from any suitable source of power through bevelled gears 3 and 4. Carried on the upper end of the shaft 1 is the conical table 5. Disposed between the bottom of the table 5 and the upper bearing of the shaft 1 on the frame 2 is a sleeve member 6 provided at its top and bottom with suitable thrust bearings. This sleeve 6 is connected to be rotated at a reduced rate of speed through pinion 7 on the shaft 1 immediately above the bevelled gear 3, gear 8 on vertical stub shaft 9, a bearing for which is provided in a projection on one side of the upper bearing of the shaft 1, pinion 10 on the upper end of the stub shaft 9 and pinion 11 secured to the lower end of the sleeve 6. The sleeve 6 carries the annular platform 12 by means of a spider construction consisting of a plurality of radial arms 13 bolted at their inner ends to the sleeve 6 and joined into a unitary construction by an integral ring 14. The annular platform 12 is suitably supported on the outer ends of the arms 13 immediately below and surrounding the outer edge of the table 5 and is provided with an inner retaining wall 15. An outer retaining wall 16, the lower edge of which is vertically slidable and rests by gravity upon the platform 12, is supported upon stationary standards 17.

As shown, the surface of the conical table 5 near its edge is turned into a flat or horizontal portion 5ª, and two circumferential rows of vertical pins are provided in this flat portion, the inner row 18 being so spaced as to break up the adhering dates into small units, and the outer row 19 being staggered with respect to those of the inner row, that is, they are disposed in the radial lines intermediate the respective pins of the inner row. Because of the rapid travel of the pins with the table, manifestly they do not need to be placed so closely together as would be the case if they were stationary. These pins, preferably, are composed of a sleeve freely rotative upon a central bearing pin to minimize the likelihood of injury to the delicate skins of the dates.

Overhanging the center or apex of the table 5 is a suitable feed hopper 20 to which the solid blocks of dates may be delivered by an endless carrier 21. Preferably, baffle plates, such as 22 and 23, will be provided within the hopper, also a stream of suitable hot fluid, such as steam and hot water, will be directed within the hopper through a nozzle 24.

A suitable curtain 25 suspended from brackets 26 on the upper end of the standard 17, hangs just inside the retaining wall 16 and serves to catch the dates as they are thrown by centrifugal force upon the table 5 and causes them to fall upon the revolving platform 12. This curtain will be of suitable material, such as canvas, to afford the desired resiliency and avoid bruising the dates.

At one point around the platform 12 the outer wall 16 opens out on to a suitable chute 27. A scraper 28 extends across the face of the revolving platform in position to direct the dates on the platform to the chute 27. To prevent piling up of the dates at this scraper, the scraper may be made in the form of a continuous belt free to move in the proper direction to assist in carrying out the dates, or, if desired, it may be power driven. A suitable shaker 29 may be provided underneath the mouth of the chute 27. This shaker is preferably connected up in any suitable way to the same source of power as the shaft 1.

The hopper 20 is preferably disposed a short distance above the apex of the table 5, so that the block of dates as it falls and strikes the apex of the table, will be spread out and broken into several parts or smaller masses. Usually the block will already have been loosened up and more or less broken by the effect of the blast of steam and hot water in the hopper and also by reason of its striking the baffles 22 and 23. It immediately spreads out in all directions, therefore, as it strikes the table 5 and the dates have a considerable centrifugal force imparted to them by reason of the comparatively rapid rotation of the table 5. I have found, for example, that a rotation of four hundred revolutions per minute gives satisfactory results.

The water from the nozzle 24 is continually flowing over the table 5 and the dates are thereby kept wet and the tendency of the dates to stick together is very much reduced. As they strike the pins 18 they have sufficient force to crowd through individually or in small units and the likelihood that two shall stick together is practically eliminated by the pins 19 which are again directly in the path of the dates as they emerge from between the pins 18.

From between the pins 19 the dates drop down on to the platform 12, either directly or after striking the curtain 25. This platform is preferably perforated, as shown, so as to allow the water which runs off the table 5 to flow freely down through the platform, but the dates are so thorougly wet that there is little tendency for them to stick together. The speed of this platform is considerably below that of the table 5, a ratio of one to four being generally satisfactory.

The platform 12 rotates in a counter clockwise direction, as viewed in Fig. 1, and the dates are thus carried off by the scraper 28 on to the chute 27 and thence on to the shaker 29. This shaker has a foraminous bottom and the shaking action tends to remove the water and any dirt from the dates.

It is obvious that various modifications may be made in the apparatus shown in the drawings and above particularly described within the principle and scope of my invention.

I claim:

1. The method of separating a mass of adhering fruit cemented together by their exuded sugars consisting in impelling the fruit against separating barriers properly spaced to permit only small units to pass through and imparting sufficient momentum to the fruit to effect its passage between the barriers.

2. The method of separating a mass of adhering fruit cemented together by their exuded sugars consisting in first softening the sugars to weaken their adhesive force and then impelling the fruit against separating barriers properly spaced to permit only small units to pass through and imparting sufficient momentum to the fruit to effect its passage between the barriers.

3. The method of separating a mass of adhering fruit cemented together by their exuded sugars consisting in breaking up the mass into relatively small masses, subjecting the whole to the action of a solvent to weaken the adhesive force of the sugars, and then impelling the small masses against separating barriers moving in a row transverse to the path of the mass and thereby imparting sufficient momentum to the small masses to cause the fruit to pass between the moving barriers.

4. The method of separating a mass of adhering fruit cemented together by their exuded sugars consisting in imparting centrifugal force to the fruit and utilizing their momentum to cause them to pass through openings sufficiently small to effect a separation of the fuit.

5. The method of separating a mass of adhering fruit cemented together by their exuded sugars consisting in first softening the sugars to weaken their adhesive force and then imparting centrifugal force to the fruit and utilizing their momentum to cause them to pass through openings sufficiently small to effect a separation of the fruit.

6. The method of separating a mass of adhering fruit cemented together by their fruit sugars, consisting in wetting the fruit with a fluid to lessen the adhesive action of the sugars, permitting the mass to fall a sufficient distance to break it up into smaller masses, and then simultaneously imparting centrifugal force to the small masses and utilizing their momentum to cause the fruit to pass through openings sufficiently small to effect a separation of the fruit.

7. The method of separating a mass of adhering fruit cemented together by their fruit sugars, consisting in wetting the fruit with fluid to lessen the adhesive action of the sugars, then imparting centrifugal force to the fruit and utilizing their momentum to cause them to pass through an opening of such size as to effect separation of the fruit, and then subjecting the separated fruit to a shaking action.

8. The method of separating a mass of adhering fruit cemented together by their fruit sugars, consisting in wetting the fruit with a fluid to lessen the adhesive action of the sugars, permitting the mass to fall a sufficient distance to break it up into smaller masses, then simultaneously imparting centrifugal force to the smaller masses and utilizing their momentum to cause the fruit to pass through openings of such size as to effect a separation of the fruit, and then subjecting the separated fruit to a shaking action.

9. An apparatus of the class described comprising a rotatable member adapted to receive a mass of adhering fruit, means to rotate the member at a speed sufficient to impart centrifugal force to the fruit, and separating means surrounding the axis of rotation and adapted to break up the mass by impact thereagainst and separate the adhering fruit as the fruit passes therethrough under the momentum imparted to it by the centrifugal force.

10. An apparatus of the class described, comprising a rotatable member adapted to receive a mass of adhering fruit, means to rotate the member at a speed sufficient to impart centrifugal force to the fruit, and barriers arranged circumferentially about the axis of rotation and spaced to break up the fruit by impact thereagainst and effect separation of the fruit as the fruit passes therethrough.

11. An apparatus of the class described comprising a rotatable member adapted to receive a mass of adhering fruit, means to rotate the member at a speed sufficient to impart centrifugal force to the fruit, and barriers carried by and rotatable with the said member and arranged circumferentially about the axis of rotation and spaced to break up the fruit by impact thereagainst and effect separation of the fruit as the fruit passes therethrough.

12. An apparatus of the class described comprising a substantially circular horizontal table, means for causing the table to rotate upon its center as an axis, means for delivering a mass of adhering fruit substantially upon the center of the table, and a row of upright pins carried by the table and circumferentially disposed near the periphery thereof, the pins being spaced to effect separation of the fruit as the fruit passes therethrough.

13. An apparatus of the class described comprising a substantially circular horizontal table, means for causing the table to rotate upon its center as an axis, means for delivering a mass of adhering fruit substantially upon the center of the table, and two circumferential rows of upright pins carried by the table near its periphery, the pins of one row being staggered radially with respect to those of the other row.

14. An apparatus of the class described comprising a conical table, means for causing the table to rotate upon its center as an axis, means for delivering a mass of adhering fruit by gravity upon the apex of the table, and a row of upright pins carried by the table and circumferentially disposed near the periphery thereof, the pins being spaced to effect separation of the fruit as the fruit passes therethrough.

15. An apparatus of the class described comprising a conical table, means for causing the table to rotate upon its center as an axis, a hopper overhanging the apex of the table and adapted to drop a mass of adhering fruit upon said apex, a nozzle in said hopper arranged to direct a stream of fluid upon said fruit as it passes through the hopper, and a row of upright pins carried by the table and circumferentially disposed near the periphery thereof, the pins being spaced to effect separation of the fruit as the fruit passes therethrough.

16. An apparatus of the class described comprising a conical table, means for causing the table to rotate upon its center as an axis, a hopper overhanging the apex of the table and adapted to drop a mass of adhering fruit upon said apex, baffle plates in said hopper designed to strike and partially break up the mass of fruit, a nozzle in said hopper arranged to direct a stream of fluid upon said fruit as it passes through the hopper, and a row of upright pins carried by the table and circumferentially disposed near the periphery thereof, the pins being spaced to effect separation of the fruit as the fruit passes therethrough.

17. An apparatus of the class described comprising a substantially circular horizontal table, means for causing the table to rotate upon its center as an axis, means for delivering a mass of adhering fruit substantially upon the center of the table, a row of upright pins carried by the table and circumferentially disposed near the periphery thereof, the pins being spaced to effect separation of the fruit as the fruit passes therethrough, and a rotative annular platform surrounding the circular table and adapted to receive the separated fruit as it passes through the pins.

18. An apparatus of the class described comprising a substantially circular horizontal table, means for causing the table to rotate upon its center as an axis, means for delivering a mass of adhering fruit substantially upon the center of the table, a row of upright pins carried by the table and circumferentially disposed near the periphery thereof, the pins being spaced to effect separation of the fruit as the fruit passes therethrough, a rotative annular platform surrounding the circular table and adapted to receive the separated fruit as it passes through the pins, a circular wall surrounding the annular platform having a discharge opening therein, and a scraper member extending across the annular platform and adapted to direct the fruit out of the discharge opening.

In witness whereof I hereunto subscribe my signature.

ALEXANDER W. STOTT.